(12) United States Patent
Tolpin et al.

(10) Patent No.: US 11,201,923 B2
(45) Date of Patent: Dec. 14, 2021

(54) TRANSFERRING DIGITAL DEVICE OWNERSHIP VIA A SIGNED TRANSFER REQUEST

(71) Applicant: MICROSOFT TECHNOLOGY LICENSING, LLC, Redmond, WA (US)

(72) Inventors: Alexander I. Tolpin, Redmond, WA (US); Rajeev Mandayam Vokkarne, Sammamish, WA (US); Puneet Gupta, Jersey City, NJ (US); Timothy James Larden, Bellevue, WA (US); Jelani Z. Brandon, Woodinville, WA (US); SachinKumar ChandraMohan, Irvine, CA (US); Mounica Arroju, Redmond, WA (US); Tamer Awad, Redmond, WA (US); Nicole Berdy, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 506 days.

(21) Appl. No.: 16/102,607

(22) Filed: Aug. 13, 2018

(65) Prior Publication Data

US 2020/0053156 A1 Feb. 13, 2020

(51) Int. Cl.
*H04L 29/08* (2006.01)
*G06F 9/4401* (2018.01)
(Continued)

(52) U.S. Cl.
CPC .......... *H04L 67/125* (2013.01); *G06F 9/4411* (2013.01); *H04L 9/3213* (2013.01); *H04L 63/12* (2013.01); *H04L 67/34* (2013.01)

(58) Field of Classification Search
CPC ... H04L 9/3213; H04L 9/3234; H04L 9/3263; H04L 63/08; H04L 63/12; H04L 67/12;
(Continued)

(56) References Cited

U.S. PATENT DOCUMENTS 6,041,411 A 3/2000 Wyatt
2004/0073801 A1* 4/2004 Kalogridis ............ G06F 21/305
713/176
(Continued)

FOREIGN PATENT DOCUMENTS

WO 2016060742 A1 4/2016
WO 2016138431 A1 9/2016
WO 2016200535 A1 12/2016

OTHER PUBLICATIONS

"Guest Access", Retrieved From: https://web.archive.org/web/20171026161738/https:/www.masterlock.com/bluetoothlockbox/guest-access, Oct. 26, 2017, 3 Pages.
(Continued)

*Primary Examiner* — Nicholas R Taylor
*Assistant Examiner* — Michael Li
(74) *Attorney, Agent, or Firm* — Holzer Patel Drennan (57) ABSTRACT

Transferring control over a device. A method includes, receiving a first indication, including a first verifiable token, from a first entity that at least a portion of control of a device should be relinquished by the first entity. A second indication is received from the second entity, including a second verifiable token, that the at least a portion of control should be transferred to the second entity. The first token and the second token are verified. As a result of verifying the first token and the second token, the at least a portion of control of the device is transferred from the first entity to the second entity. Transferring the at least a portion of control of the device from the first entity to the second entity includes updating the device with configuration applicable to the second entity.

18 Claims, 3 Drawing Sheets

(51) Int. Cl.
    *H04L 9/32*     (2006.01)
    *H04L 29/06*     (2006.01)

(58) Field of Classification Search
    CPC ....... H04L 67/30; H04L 67/34; H04L 67/125; H04W 4/70; H04W 12/0609; H04W 12/0023; H04W 12/1008; H04W 12/04071; G06F 9/4411; G06F 21/44; G06F 2221/2129
    See application file for complete search history.

(56) References Cited

U.S. PATENT DOCUMENTS

| | | | |
|---|---|---|---|
| 2016/0112429 A1* | 4/2016 | Sundaresan | H04W 12/08 726/4 |
| 2016/0306966 A1* | 10/2016 | Srivastava | H04L 63/08 |
| 2016/0364787 A1 | 12/2016 | Walker et al. | |
| 2017/0024818 A1 | 1/2017 | Wager et al. | |
| 2017/0250814 A1 | 8/2017 | Brickell et al. | |

OTHER PUBLICATIONS

"Knox Manage", Retrieved From: https://www.samsungknox.com/fr/solutions/it-solutions/knox-manage, Retrieved On: Jul. 11, 2018, 12 Pages.

"Set up Android devices your company owns", Retrieved From: https://support.google.com/a/answer/7129612?hl=en, Retrieved On: Jul. 11, 2018, 3 Pages.

"Transfer of Ownership", Retrieved From: http://customers.watchguard.com/articles/Article/Transfer-of-Ownership/, Retrieved On: Jul. 11, 2018, 3 Pages.

Eiden, et al., "Remotely Claim or Transfer Device Ownership to a Customer", Retrieved From: https://community.particle.io/t/remotely-claim-or-transfer-device-ownership-to-a-customer/21886, Apr. 8, 2016, 6 Pages.

"International Search Report and Written Opinion Issued in PCT Application No. PCT/US19/038792", dated Sep. 18, 2019, 12 Pages.

* cited by examiner

FIG. 1

|   |   |   |   |
|---|---|---|---|
|   |   |   |   |
|   |   |   |   |
| Digital Device 1 |   |   | Entity 1 |
|   |   |   |   |
|   |   |   |   |
|   |   |   |   |
|   |   |   | Table 126 |

128 → (pointing to Digital Device 1 row)

FIG. 2A

|   |   |   |   |
|---|---|---|---|
|   |   |   |   |
|   |   |   |   |
| Digital Device 1 |   |   | Entity 2 |
|   |   |   |   |
|   |   |   |   |
|   |   |   |   |
|   |   |   | Table 126 |

128 → (pointing to Digital Device 1 row)

TRANSFERRING DIGITAL DEVICE OWNERSHIP VIA A SIGNED TRANSFER REQUEST

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has allowed for the development and proliferation of so called Internet of Things (IoT) networks. In particular, physical devices can have computer hardware, software, and sensors implemented on the physical devices which allows the physical devices to communicate with each other in a networked fashion.

Ownership of devices in networks, such as IoT networks, can be difficult to ascertain and maintain. In particular, devices having disparate owners can be implemented on the same networks. This is often, particularly true, when a cloud service provider has multiple tenants, where each of the tenants has control over different devices. Thus, a central service may maintain control over various devices, but different devices may be maintained on behalf of different owner entities. There are challenges in such networks with respect to who owns and controls the physical devices. Additionally, there are challenges related to transferring ownership of physical devices in such networks. For example, physical devices may be bought and sold among different entities while still remaining on the network. The devices may remain in the same physical location (or be transferred to new locations) be part of the same network, perform the same actions, but belong to different entities over time. The entities that own the physical devices have authorization to obtain data from the sensors on the physical devices, direct the physical devices to communicate with other devices, control power states of the physical devices, etc.

Thus, it is important to maintain ownership information about various physical devices in a network to ensure that the devices are under control of the proper entities.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of transferring a least a portion of control over a device. The method includes, receiving a first indication from a first entity that at least a portion of control of a device should be relinquished by the first entity. The first indication includes a first verifiable token from the first entity. A second indication is received from the second entity that the at least a portion of control should be transferred to the second entity. The second indication includes a second verifiable token from the second entity. The first token and the second token are verified. As a result of verifying the first token and the second token, the at least a portion of control of the device is transferred from the first entity to the second entity. Transferring the at least a portion of control of the device from the first entity to the second entity includes updating the device with configuration applicable to the second entity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are directed to methods and systems for transferring control over physical devices in a network to and from various entities. This can be done in a secure way to ensure that rogue entities do not gain control over physical devices in a network. In particular, embodiments may include a device management service that manages ownership (along with other control, access, provisioning and/or other elements) of physical devices on a network. The device management service includes an enumeration of ownership information.

When two entities have decided to transfer control of a physical device between themselves (or even when entities sua sponte, decide to relinquish control or gain control of an asset respectively), they each can message the device management service indicating that transfer of control should occur. The messages from each of the entities to the device management service comprises an indication of whether they are transferring or receiving control, along with verifiable proof. The device management service evaluates the messages, including the proof, to authenticate the transfer of control. If the messages from both of the parties can be authenticated, then the device management service updates records for the network indicating the new control of the physical device.

The device management service can then enforce the updated control. For example, the device management service may update ownership information in an ownership datastore. Alternatively or additionally, the device management service may update authorized access control lists indicating entities having access to the device. Alternatively or additionally, the device management service may provision the device for use by the new owner of control over the device. Provisioning may include, for example, setting access requirements for the device, provisioning authentication for the device, assigning endpoints for the device, configuring the device to communicate (for obtaining data and/or providing sensor readings) with certain other devices, installing executable instructions into memory of the device, defining property values for the device, configuring sensors for the device, etc.

Figure 1:
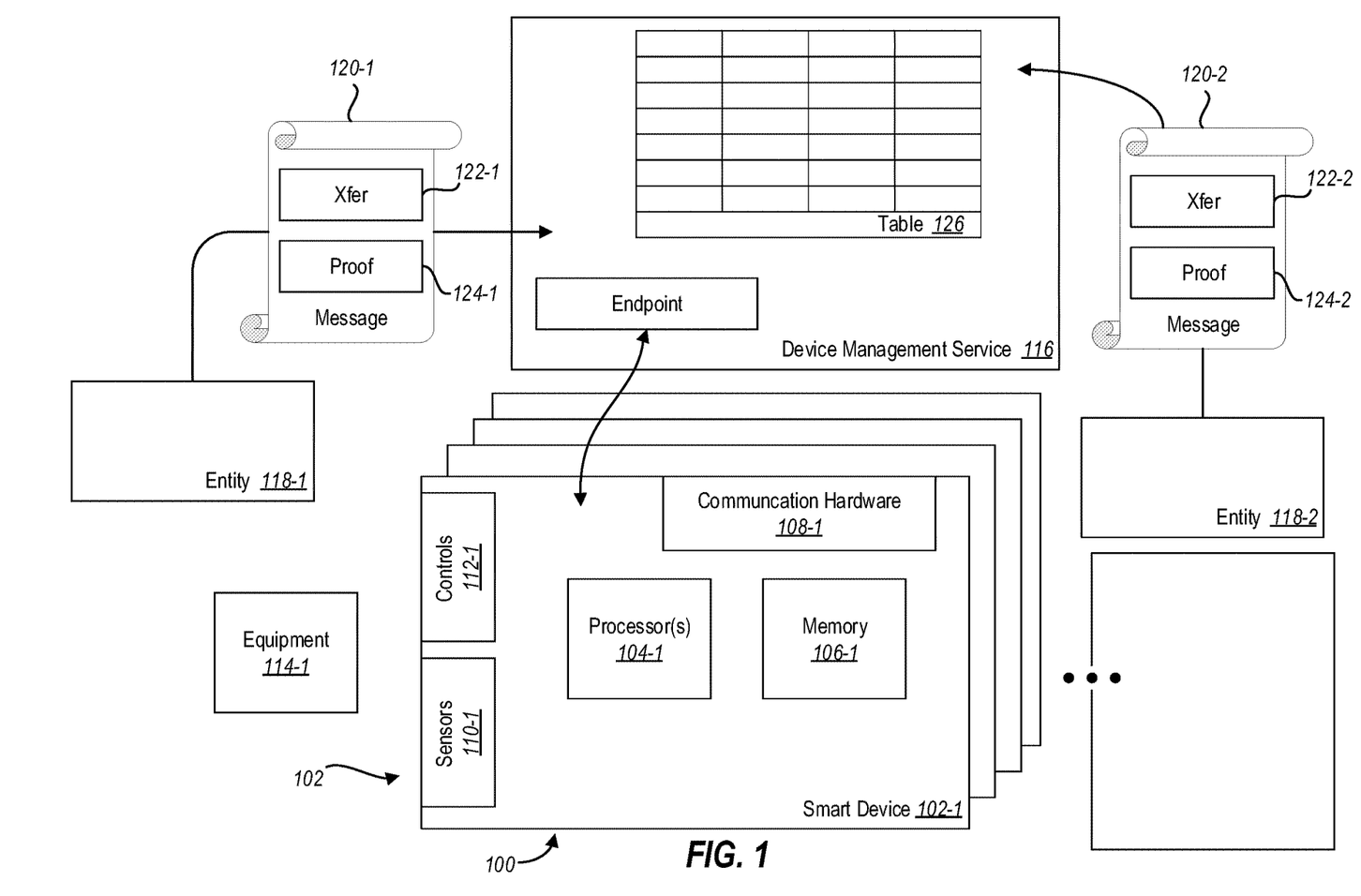
FIG. 1 illustrates a system for transferring digital devices between entities in a network.

Referring now to FIG. 1, an example embodiment is illustrated. FIG. 1 illustrates a device network 100. The device network 100 includes a plurality 102 of smart devices. The smart devices in the plurality 102 of smart devices are coupled together in the network 100. This allows the smart devices to communicate with each other. For example, smart devices can request information from each other, provide information to each other, work together to accomplish certain tasks, etc.

In some embodiments, the plurality 102 of smart devices may be implemented as part of a cloud-based control network. In this example, a cloud service, such as the device management service 116, may control various aspects of the devices in the plurality 102 of devices.

The smart devices in the plurality 102 of smart devices include various pieces of smart technology. The availability of compact smart technology has enabled virtually any device to be a smart device. For example, smart technology can be included in large smart devices such as shipping tankers, planes, cars, etc. However, miniaturization of smart technology also allows even small devices, such as watches, writing implements, coins, insect sized drones, etc. to be smart devices. Examples of smart technology are illustrated with reference to the smart device 102-1.

The smart device 102-1 includes one or more processors 104-1. The smart device 102-1 includes computer readable media 106-1, which in the current example, is computer readable memory. The computer readable media 106-1 can store instructions that can be executed by the one or more processors 104-1. This gives the smart device the ability to perform digital data processing tasks. For example, the smart device 102-1 can perform various computations, analyze data, generate data, generate communication data, etc.

The smart device 102-1 also includes communication hardware 108-1. The communication hardware 108-1 allows the smart device 102-1 to communicate with other smart devices and/or with other digital entities. For example, the smart device 102-1 may communicate with other smart devices among the plurality 102 of smart devices in the network 100. For example, the smart devices may be able to send and receive data generated and/or collected at the smart devices. For example, the smart device 102-1 may be able to collect data from sensors 110-1. This sensor data can be shared among the various devices in the plurality 102 of devices for various uses.

Alternatively or additionally, smart devices may include controls, such as controls 112-1 in smart device 102-1. The controls 112-1 may be configured to control equipment 114-1. The equipment 114-1 may be items such as motors, blowers, heaters, chillers, lights, radios, etc. The smart devices may communicate with each other to cause the equipment to be controlled.

Alternatively or additionally, the smart device 102-1 may be able to communicate with other digital entities, such as a device management service 116. For example, the smart devices may be able to communicate with the device management service 116 for management. For example, the device management service may include functionality for provisioning devices and/or controlling access to device data. In some embodiments, the device management service 116 may provision a device based on an entity owning some level of control of the device.

For example, in some embodiments, an entity may have full legal title to a device. Alternatively or additionally, an entity may have title to all or a portion of data produced by a device. Alternatively, an entity may have title to all or a portion of the right to use the controls on a device.

As stated previously, a digital device may be provisioned based on ownership of certain control of the device (where control could be any one of receiving data from sensors, controlling the controls, communicating with the device, etc.). For example, the device management service 116 may provision the device 102-1 for use by an owner of control over the device, in this example, the entity 118-1.

In one example, provisioning may include, for example, setting access requirements for the device. For example, provisioning may indicate that only certain other entities associated with the owner of control over the device 102-1, i.e., entity 118-1, may access the device. In some embodiments, controlling entities that have access to the device 102-1 does not necessarily require that the device be updated. Rather, as will be discussed below, in some embodiment, the device management service 116 may include authorized access lists indicating what entities are allowed to access a device. These lists are typically based on the entity that owns the device. For example, entities associated with an entity that owns a device (at the present point in the example, entity 118-1) will be allowed to access the device 102-1.

In another example, provisioning may include configuring authentication for communicating with the device. For example, the device management service 116 may configure the device 102-1 such that certain authentication is needed to communicate with the device 102-1. The authentication may be authentication that is available to devices under the control of the entity 118-1, which up to this point of the illustrated example is also the owner of at least a portion of control of the device 102-1.

In another example, provisioning may include assigning endpoints for the device to communicate with. For example, the device management service 116 may configure the device 102-1 to communicate with certain endpoints, such as endpoints accessible by following certain uniform resource locators, or other pointers. In some embodiments, these endpoints are determined based on ownership of at least a portion of the control of the device 102-1.

In another example, provisioning may include configuring the device to communicate (for obtaining data and/or providing sensor readings) with certain other devices. For example, the device management service 116 may configure the device 102-1 to communicate with certain other devices. For example, in certain embodiments, the entity 118-1 may have control over a number of different devices. When the device 102-1 is provisioned for the entity 118-1, the device 102-1 may be configured to communicate with other devices controlled by the entity 118-1. This may be accomplished by providing the device with address information, certificates, keys, or other information needed to communicate with other devices controlled by the entity 118-1.

In another example, provisioning may include installing executable instructions into memory of the device. For example, in some embodiments, computer executable instructions can be provided by the device management service 116 to the device 102-1, which can then be stored in the computer readable media 106-1 for later execution by the processors 104-1. For example, some of the instructions provided may be instructions that cause the smart device 102-1 to perform the various functions described previously herein.

In another example, provisioning may include defining property values for the device. For example, the smart device 102-1 may have certain name properties, network identifier properties, descriptive properties, owner identifier properties, etc. stored on the device 102-1. Provisioning can set the values of the properties as appropriate. Often, these property values will be determined based on ownership of certain control over the device 102-1, i.e., based on the entity 118-1.

In another example, provisioning may include configuring sensors for the device.

In another example, provisioning may include configuring controls for the device.

Embodiments may include functionality for transferring control of at least a portion of a device from one entity to another entity. For purposes of illustration, assume that entity 118-1 has control over the device 102-1 and that the entity 118-1 has negotiated with the entity 118-2 to transfer control over the device 102-1 to entity 118-2. Although this negotiation is not necessary. For example, in some embodiments, the first entity 118-1 may simply relinquish control of the device 102-1 without respect to what entity it is relinquishing control to. For example, the first entity 118-1 may relinquish control to consign the device 102-1 to the device management service 116 for sale to other entities. Alternatively or additionally, the first entity 118-1 may relinquish control to donate the device 102-1 to the device management service 116 for transfer to other entities. Alternatively or additionally, the first entity 118-1 may relinquish control as a result of a lease expiration on the device 102-1. Etc.

To accomplish the transfer, the entity 118-1 notifies the device management service that it wishes to relinquish control of the device 102-1. In some embodiments, this may be a general relinquishment. However, in other embodiments, a specific transferee must be identified. For example, in some embodiments, the entity 118-1 may indicate that it wants to transfer ownership of control of at least a portion of the device 102-1 to the entity 118-2. FIG. 1 illustrates that the entity 118-1 sends a message 120-1 to the device management service 116. The message 120-1 includes a transfer indicator 122-1 and proof 124-1.

Note that the message may be conveyed in a number of different ways. For example, in some embodiments, the message may be conveyed through a portal at the device management service 116 which the entity 118-1 can access using appropriate computing device. For example, the device management service 116 may have a web portal or other portal that allows entities to access the device management service 116.

In an alternative or additional example, embodiments could allow the message to be transmitted using removable media. For example, the message may be included on a flash drive or other removable media. For example, consider the case where a manufacturer is selling the device to a particular end user. The manufacturer (in this case, entity 118-1) could include in packaging for the device, a flash drive including the message 120-1 relinquishing control of the device and/or an indication indicating that the device should be transferred to a customer (in this case, the entity 118-2).

The transfer indicator 122-1 identifies a device and an action to be taken. For this example, the transfer indicator 122-1 identifies the device 102-1 and indicates that the device should be relinquished by the entity 118-1. In some embodiments, this can be a general relinquishment that does not identify a transferee. However, in other embodiments, a transferee is specified. For example, the transfer indicator may indicate that the entity 118-1 wishes to transfer the device 102-1 (or at least a portion of control of the device 102-1) to the entity 118-2. This may be used to add an additional level of protection in that the entities have knowledge of each other providing additional proof that the transfer should take place.

The proof 124-1 includes a verifiable token that allows the device management service to authenticate at least one of the entity 118-1 or the validity of the message 120-1. For example, the proof 124-1 may include a certificate (such as a X.509 certificate). Alternatively or additionally, the proof 124-1 may include a password. Alternatively or additionally, the proof 124-1 may include a username and password. Alternatively or additionally, the proof 124-1 may include another verifiable token.

Further, to accomplish the transfer, the entity 118-2 sends a message 120-2 to the device management service 116. Similar to the message 120-1, the message 120-2 includes a transfer indicator 122-2 and proof 124-2.

As with the example above, the message 122-2 may be sent in a number of different fashions, including through a portal, using removable media, or in other fashions.

The transfer indicator 122-2 indicates that the entity 118-2 wishes to claim the smart device 102-1. In some embodiments, this may be a general indication that the entity 118-2 wishes to claim the smart device 102-1 without consideration of what entity previously owned the device 102-1. However, in other embodiments, the transfer indicator 122-2 includes an indication that the smart device 102-1 should be transferred from the entity 118-1 to the entity 118-2. As noted previously, this provides additional proof that the transfer requests indicated by the messages 120-1 and 120-2 are valid.

The proof 124-2 includes a verifiable token that allows the device management service to authenticate at least one of the entity 118-2 or the validity of the message 120-2. For example, the proof 124-2 may include a certificate. Alternatively or additionally, the proof 124-2 may include a password. Alternatively or additionally, the proof 124-2 may include a username and password. Alternatively or additionally, the proof 124-2 may include another verifiable token.

The device management service 116 can verify the proof 124-1 and 124-2 from the entities 118-1 and 118-2 respectively. Verifying proof may include authenticating certificates. For example, the device management service itself may be a certificate authority that issued certificates to the entities 118-1 and 118-2 based on private keys stored for the entities 118-1 and 118-2. Alternatively or additionally, the device management service may provide certificates provided in the proof 124-1 and 124-2 to an external certificate authority to authenticate certificates.

Alternatively or additionally, the device management service may authenticate that passwords or username/password pairs in the proof 124-1 and 124-2 match the entities 118-1 and 118-2 respectively.

If the proofs 124-1 and 124-2 can be authenticated by the device management service 116, then the device management service 116 causes the transfer of at least a portion of control of the device 102-1 from the first entity 118-1 to the second entity 118-2.

In some embodiments, as part of the authentication process, the device management service 116 may validate that both entities 118-1 and 118-2 are valid tenants of a particular cloud service. For example, the device management service 116 may be a service included in a cloud service that manages tenants. The device management service 116 may be configured to manage devices for tenants of the cloud service. If a rogue entity attempts to gain access to one of the devices, the device management service 116 can guard against this by ensuring that the entity is a tenant of the cloud service, and is authorized to relinquish control and/or assume control of a device.

In some embodiments transferring at least a portion of control of the device 102-1 comprises updating ownership records at the device management service 116. In the example illustrated, the device management service 116 includes a table 126. The table 126 may include information about each of the devices in the plurality 102 of devices. Note that while a table is illustrated here, it should be appreciated that other record keeping apparatuses may be used. For example, in some embodiments, a database, flat file, xml data structure, or other data structure may be used as a datastore for managing ownership information.

Figure 2A:
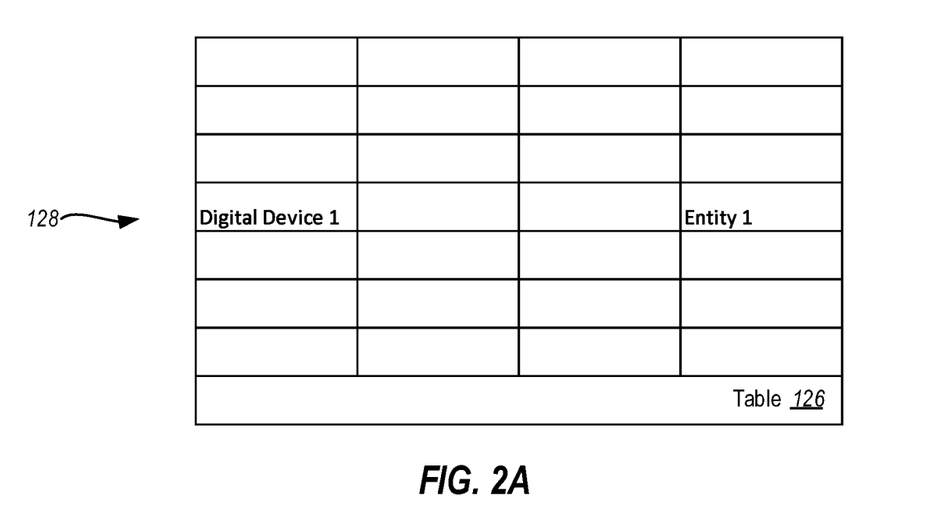
FIG. 2A illustrates a table in a first state when ownership of control of a device is held by a first entity.
Figure 2B:
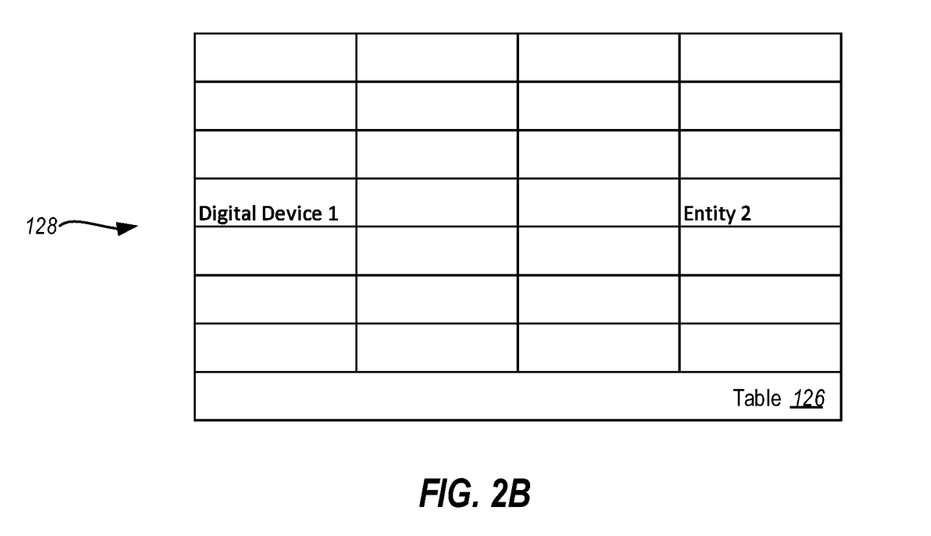
FIG. 2B illustrates the table in a second state once ownership of control of the device is held by a second entity.

The information about each of the devices in the plurality 102 of devices may further include an indication of ownership. For example, FIGS. 2A and 2B illustrate different states of the table 126. FIG. 2A illustrates the state of the table 126 before the at least a portion of control has been transferred to the entity 118-2. Thus, the table 126 includes an entry 128 for the digital device 102-1. The entry 128 includes an indication that ownership of control of at least a portion of the digital device 102-1 belongs to the entity 118-1.

FIG. 2B illustrates the state of the table 126 after the control of at least a portion of the digital device 102-1 has been transferred to the entity 118-2. The representation illustrated in FIG. 2B illustrates that the entry 128 is updated to include an indication that control over at least a portion of the device now belongs to the entity 118-2.

Other information may be included in the table 126 (or other data structure). This information may include a registration identifier, key information, tenant identification, originating identifier, enrollment lists, etc.

The registration identifier includes a unique identifier for the device in the device management service 116. This registration identifier can be used to distinguish the device 102-1 from other devices in the plurality 102 of devices.

The key information includes information about how a device validates its identity. For example, the key information may include a private key that can be used to validate certificates sent by the device 102-1. Alternatively or additionally, the key information may include information that can be used by the device management service 116 to decode messages from the device 102-1.

The tenant information identifies a tenant in a cloud service that owns the device.

The originating id identifies a global endpoint for devices. In particular, each device in the network 100 has a single global endpoint to which it connects. The endpoint is typically a single global endpoint for all devices with the particular originating id.

Transferring control of at least a portion of the digital device 102 may include additional actions at the device management service 116. For example, the device management service 116 may include functionality for provisioning devices in the plurality 102 of devices. Thus, transferring control of at least a portion of the digital device 102 may include re-provisioning the device for the entity 118-2.

In one example, re-provisioning may include, for example, setting access requirements for the device. For example, re-provisioning may indicate that only certain other entities associated with the owner of control over the device 102-1, i.e., entity 118-2, may access the device.

In another example, re-provisioning may include configuring authentication for communicating with the device. For example, the device management service 116 may configure the device 102-1 such that certain authentication is needed to communicate with the device 102-1. The authentication may be authentication that is available to devices under the control of the entity 118-2, which, in the illustrated example, is now the owner of at least a portion of control of the device 102-1.

In another example, re-provisioning may include assigning endpoints for the device to communicate with. For example, the device management service 116 may configure the device 102-1 to communicate with certain endpoints, such as endpoints accessible by following certain uniform resource locators, or other pointers. In some embodiments, these endpoints are determined based on the entity 118-2 now having ownership of at least a portion of the control of the device 102-1.

In another example, re-provisioning may include configuring the device to communicate (for obtaining data and/or providing sensor readings) with certain other devices. For example, the device management service 116 may configure the device 102-1 to communicate with certain other devices. For example, in certain embodiments, the entity 118-2 may have control over a number of different devices. When the device 102-1 is re-provisioned for the entity 118-2, the device 102-1 may be configured to communicate with other devices controlled by the entity 118-2. This may be accomplished by providing the device with address information, certificates, keys, or other information needed to communicate with other devices controlled by the entity 118-2.

In another example, re-provisioning may include installing executable instructions into memory of the device. For example, in some embodiments, computer executable instructions can be provided by the device management service 116 to the device 102-1, which can then be stored in the computer readable media 106-1 for later execution by the processors 104-1. For example, some of the instructions provided may be instructions that cause the smart device 102-1 to perform the various functions described previously herein.

In another example, re-provisioning may include re-defining property values for the device. For example, the smart device 102-1 may have certain name properties, network identifier properties, descriptive properties, owner identifier properties, etc. stored on the device 102-1. Re-provisioning can set the values of the properties as appropriate based on ownership of certain control over the device 102-1 by the entity 118-2.

In another example, re-provisioning may include configuring sensors for the device as indicated by the entity 118-2.

In another example, re-provisioning may include configuring control for the device as indicated by the entity 118-2.

Embodiments illustrated herein have been described in the context of transferring at least a portion of control of the device from the first entity to the second entity. This can take any one of a number of different forms. For example, this may include transferring legal title to the digital device from the first entity 118-1 to the second entity 118-2. Alternatively or additionally, this may include the right to collect data produced by sensors 110-1 on the device 102-1. Alternatively or additionally, this may include the right to control equipment 114-1 coupled to the device 102-1 by having the right to control controls 112-1 coupled to the device 102-1.

Embodiments may be implemented where when the device 102-1 communicates with a correct provisioning service, then the device 102-1 is updated for the entity 118-2.

Note that in some embodiments, the entity 118-1 can create policy for access to device by entity 118-2. For example, if the transfer of control is related to a lease of the device 102-1 by the entity 118-1 to the entity 118-2, then the entity 118-1 could specify policy regarding how and when the device 102-1 could be used by the entity 118-2. This policy could be enforced by configuration of the device 102-1 as illustrated above, by controls implemented at the device management service 116 (or related services), or in other appropriate ways.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
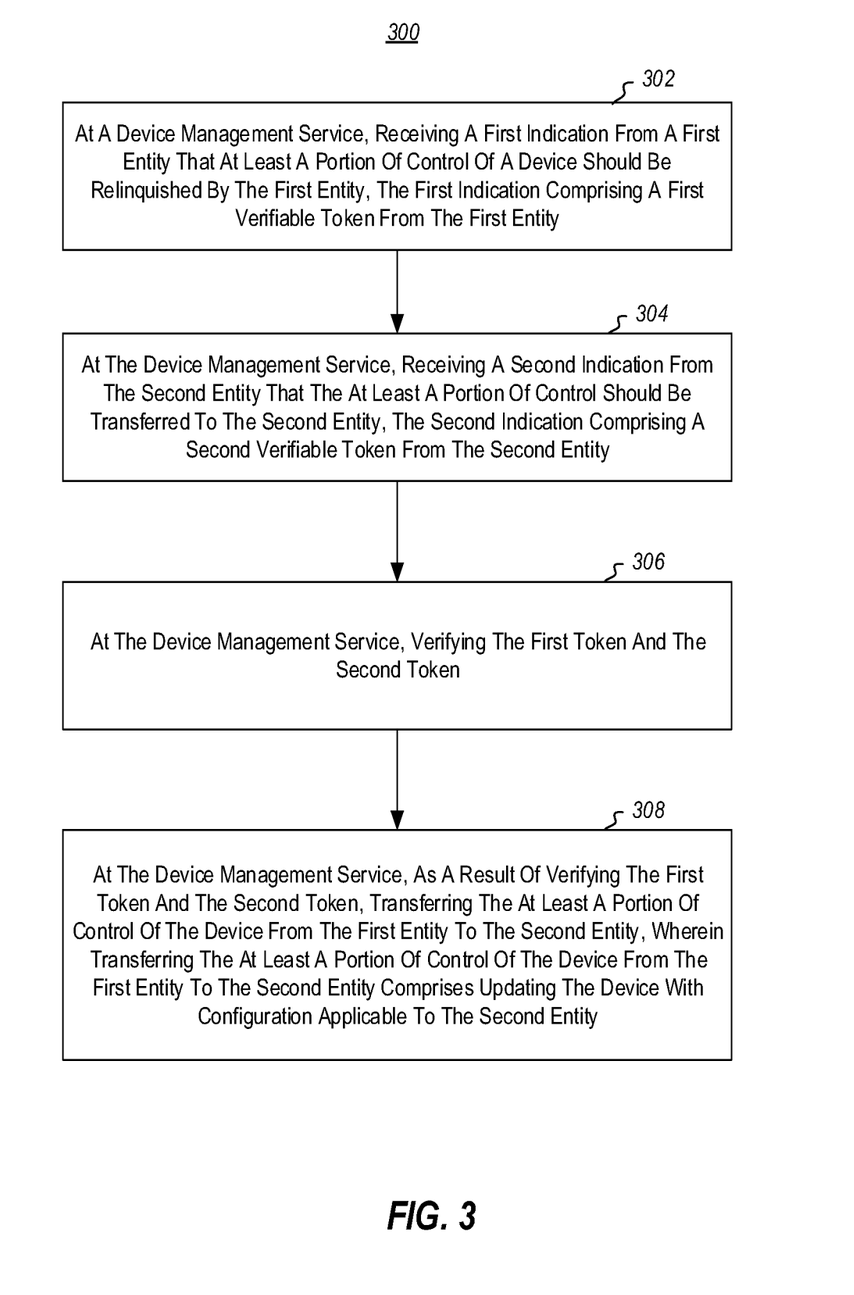
FIG. 3 illustrates a method of transferring at least a portion of control over a device from a first entity to a second entity.

Referring now to FIG. 3, a method 300 is illustrated. The method 300 includes method of transferring a least a portion of control over a device. The method includes at a device management service, receiving a first indication from a first entity that at least a portion of control of a device should be relinquished by the first entity, the first indication comprising a first verifiable token from the first entity (act 302). For example, FIG. 1 illustrates the message 120-1 being delivered to the device management service 116. The token comprises the proof 124-1.

The method 300 further includes, at the device management service, receiving a second indication from the second entity that the at least a portion of control should be transferred to the second entity, the second indication comprising a second verifiable token from the second entity (act 304). For example, as illustrated in FIG. 1, the indication includes the message 120-2 and the token includes the proof 124-2.

The method 300 further includes, at the device management service, verifying the first token and the second token (act 306).

The method 300 further includes, at the device management service, as a result of verifying the first token and the second token, transferring the at least a portion of control of the device from the first entity to the second entity, wherein transferring the at least a portion of control of the device from the first entity to the second entity comprises updating the device with configuration applicable to the second entity (act 308).

The method 300 may be practiced where the first entity is a manufacturer and the second entity is an end user.

The method 300 may be practiced where the first entity is a manufacturer and the second entity is another entity in a supply chain. For example, the second entity could be a wholesaler, retail seller, or other entity.

The method 300 may be practiced where the first entity is a first end user and the second entity is a different second end user. For example, the device could be transferred in a secondary used device market.

The method 300 may be practiced where the first entity is a manufacturer and the second entity is an end user.

The method 300 may be practiced where transferring the at least a portion of control of the device from the first entity to the second entity comprises updating an entry in a table indicating that the second entity has the at least a portion of control of the device. An example of this is illustrated in the descriptions of FIGS. 2A and 2B.

The method 300 may be practiced where receiving the first indication or the second indication comprises receiving an indication by a user inputting the information at a digital portal.

The method 300 may be practiced where the first indication or the second indication is stored on a removable media, and where receiving the first indication or the second indication comprises reading the indication from the removable media.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable media having stored thereon instructions that are executable by the one or more processors to configure the computer system to transfer at least a portion of control over a device, including instructions that are executable to configure the computer system to perform at least the following:
   at a device management service, receive a first indication from a first entity that at least a portion of control of a device should be relinquished by the first entity, the first indication comprising a first token from the first entity;
   at the device management service, receive a second indication from a second entity that the at least a portion of control should be transferred to the second entity, the second indication comprising a second token from the second entity;
   at the device management service, verify the first token to authenticate the first entity and validity of the first indication including that the first entity is authorized to relinquish control of the device;
   at the device management service, verify the second token to authenticate the second entity and validity of the second indication including that the second entity is authorized to gain control of the device; and
   at the device management service, as a result of verifying the first token and the second token, transfer the at least a portion of control of the device from the first entity to the second entity, wherein transferring the at least a portion of control of the device from the first entity to the second entity comprises updating the device with configuration applicable to the second entity.

2. The computer system of claim 1, wherein the first entity is a manufacturer and the second entity is an end user.

3. The computer system of claim 1, wherein the first entity is a manufacturer and the second entity is another entity in a supply chain.

4. The computer system of claim 1, wherein the first entity is a first end user and the second entity is a different second end user.

5. The computer system of claim 1, wherein transferring the at least a portion of control of the device from the first entity to the second entity comprises updating an entry in a table indicating that the second entity has the at least a portion of control of the device.

6. The computer system of claim 1, wherein receiving the first indication or the second indication comprises receiving an indication by a user inputting the information at a digital portal.

7. The computer system of claim 1, wherein the first indication or the second indication is stored on a removable media, and where receiving the first indication or the second indication comprises reading the indication from the removable media.

8. A method of transferring a least a portion of control over a device, the method comprising:
   at a device management service, receiving a first indication from a first entity that at least a portion of control of a device should be relinquished by the first entity, the first indication comprising a first token from the first entity;
   at the device management service, receiving a second indication from a second entity that the at least a portion of control should be transferred to the second entity, the second indication comprising a second token from the second entity;

at the device management service, verifying the first token to authenticate the first entity and validity of the first indication including that the first entity is authorized to relinquish control of the device;

at the device management service, verifying the second token to authenticate the second entity and validity of the second indication including that the second entity is authorized to gain control of the device; and at the device management service, as a result of verifying the first token and the second token, transferring the at least a portion of control of the device from the first entity to the second entity, wherein transferring the at least a portion of control of the device from the first entity to the second entity comprises updating the device with a configuration applicable to the second entity.

9. The method of claim 8, wherein the first entity is a manufacturer and the second entity is an end user.

10. The method of claim 8, wherein the first entity is a manufacturer and the second entity is another entity in a supply chain.

11. The method of claim 8, wherein the first entity is a first end user and the second entity is a different second end user.

12. The method of claim 8, wherein transferring the at least a portion of control of the device from the first entity to the second entity comprises updating an entry in a table indicating that the second entity has the at least a portion of control of the device.

13. The method of claim 8, wherein receiving the first indication or the second indication comprises receiving an indication by a user inputting the information at a digital portal.

14. The method of claim 8, wherein the first indication or the second indication is stored on a removable media, and where receiving the first indication or the second indication comprises reading the indication from the removable media.

15. A device management service comprising:
a datastore storing ownership information for devices on a network;
one or more processors; and
one or more computer-readable media having stored thereon instructions that are executable by the one or more processors to configure the computer system to perform at least the following:
receive a first indication from a first entity that at least a portion of control of a device should be relinquished by the first entity, the first indication comprising a first token from the first entity;
receive a second indication from a second entity that the at least a portion of control should be transferred to the second entity, the second indication comprising a second token from the second entity;
verify the first token to authenticate the first entity and validity of the first indication including that the first entity is authorized to relinquish control of the device;
verify the second token to authenticate the second entity and validity of the second indication including that the second entity is authorized to gain control of the device; and
update the datastore according to the first indication and the second indication responsive to the verifications of the first token and the second token.

16. The device management service of claim 15, wherein the first entity and the second entity are entities in a supply chain.

17. The device management service of claim 15, further comprising a digital portal, and wherein receiving the first indication and the second indication comprises receiving the first indication and the second indication at the digital portal.

18. The device management service of claim 15, wherein receiving the first indication and the second indication comprises reading the first indication and the second indication from a removable media.

* * * * *